United States Patent [19]
Reid

[11] Patent Number: 5,844,575
[45] Date of Patent: Dec. 1, 1998

[54] VIDEO COMPRESSION INTERFACE

[75] Inventor: John L. Reid, Portland, Oreg.

[73] Assignee: Intel Corporation, Santa Clara, Calif.

[21] Appl. No.: 671,448

[22] Filed: Jun. 27, 1996

[51] Int. Cl.[6] .................................................. G06F 13/14
[52] U.S. Cl. .......................... 345/520; 345/501; 345/521;
345/302; 386/27; 386/112
[58] Field of Search ..................................... 345/520, 521,
345/202, 328, 302; 382/166, 232–236,
248–258, 302, 303; 386/27, 33–35, 40,
109–112; 364/725.01, 725.02, 725.03

[56] References Cited

U.S. PATENT DOCUMENTS

| | | | |
|---|---|---|---|
| 5,367,629 | 11/1994 | Chu et al. | 382/253 |
| 5,594,660 | 1/1997 | Sung et al. | 345/302 |
| 5,596,420 | 1/1997 | Daum | 386/110 |
| 5,612,788 | 3/1997 | Stone | 386/85 |
| 5,748,903 | 5/1998 | Argawal | 395/200.77 |

*Primary Examiner*—John E. Breene
*Assistant Examiner*—U. Chauhan
*Attorney, Agent, or Firm*—Blakely, Sokoloff, Taylor & Zafman LLP

[57] ABSTRACT

An apparatus and method for asynchronous compression of video information in a computer system. The apparatus includes data structures and functions for specifying synchronous or asynchronous compression of at least one uncompressed video frame, for specifying latency in the compression of the at least one uncompressed video frame, for initiating asynchronous compression of the at least one uncompressed video frame by a video compressor, for asynchronously retrieving from the video compressor at least one compressed video frame, for terminating asynchronous compression of the at least one uncompressed video frames by the video compressor, and for immediately retrieving from the video compressor the at least one compressed video frame when the at least one compressed video frame remains unretrieved after asynchronous compression is terminated.

8 Claims, 2 Drawing Sheets

VIDEO COMPRESSION INTERFACE

BACKGROUND

The Microsoft Video for Windows 1.1 Programmer's Guide, published by Microsoft Corp., is incorporated by reference.

The Microsoft OLE2 Design Specification, published by Microsoft Corp., is incorporated by reference.

1. Field of the Invention

The invention relates to the field of video compression on a computer system.

2. Art Background

Modern applications of personal computers include the capture and manipulation of video information. Video information is captured into the computer from an external source such as a camera, laser disk, CD ROM, or digital or analog communications line (for example, an ISDN line). The capture hardware captures the video information in discrete units called frames, and the number of frames captured per second is called the frame rate. Once captured, the video may be played on a video screen, edited using video editing software, or else written to a file on the computer's mass storage device.

When video information is stored in a file, it is typically highly compressed to reduce the size of the file. In order to keep up with the video capture hardware, the compression must be fast enough to keep up with the frame rate. When the video in a file is played back to the display, it must be uncompressed at a rate close to or equal to the frame rate at which it was captured; otherwise, the video will play unevenly. To make the file size as small as possible, it is desireable that the compression ratio for the video information be as large as possible. However, it must be possible to compress and uncompress the video at a rate approaching the frame rate.

Microsoft® Windows® is a popular platform for video capture, compression, and playback on the personal computer. Windows is popular because of its graphical capabilities and hardware abstraction, among other things. Windows uses video capture drivers to interface between video capture hardware and video applications. Video capture drivers provide services such as single frame video capture, streaming video capture, video overlay, and access to compression features of the hardware.

In Windows, the format of a video frame is described using a data structure called BITMAPINFORHEADER. The format of this structure is shown below.

```
typedef struct tagBITMAPINFOHEADER { /* bmih */
    DWORD biSize;
    LONG biwidth;
    LONG biHeight;
    WORD biPlanes;
    WORD biBitCount;
    DWORD biCompression;
    DWORD biSizeImage;
    LONG biXPelsPerMeter;
    LONG biYPelsPerMeter;
    DWORD biClrUsed;
    DWORD biClrImportant;
} BITMAPINFOHEADER;
```

The BITMAPINFOHEADER structure contains information about the dimensions and color format of the video frame, among other things. The members have the following interpretations.

biSize
Specifies the number of bytes required by the BITMAPINFOHEADER structure.
biWidth
Specifies the width of the frame, in pixels.
biHeight
Specifies the height of the frame, in pixels.
biPlanes
Specifies the number of color planes for the target display device. This member must be set to 1.
biBitCount
Specifies the number of bits per pixel. This value must be 1, 4, 8, or 24.
biCompression
Specifies the type of compression for a compressed video frame.
biSizeImage
Specifies the size, in bytes, of the frame.
biXPelsPerMeter
Specifies the horizontal resolution, in pixels per meter, of the target display device for the frame.
biYPelsPerMeter
Specifies the vertical resolution, in pixels per meter, of the target display device for the frame.
biClrUsed
Specifies the number of color indexes in the color table actually used by the frame. If this value is zero, the frame uses the maximum number of colors corresponding to the value of the biBitCount member.
biClrImportant
Specifies the number of color indexes that are considered important for displaying the frame. If this value is zero, all colors are important.

The BITMAPINFO structure combines the BITMAPINFOHEADER structure and a color table to provide a complete definition of the dimensions and colors of a video frame.

```
typedef struct {
    BITMAPINFOHEADER bmiHeader;
    RGBQUAD bmiColors[1];
} BITMAPINFO;
```

In Windows, compression drivers provide functionality for compressing and decompressing video data. An operating system component called the Installable Compression Manager (ICM) manages compression drivers and provides functions, data structures, and messages for compression and decompression. For a particular compression format, both compression and decompression are often implemented by a single driver. Compression drivers are implemented as Dynamic Link Libraries (DLLs), which run at the execution priority of the client application which calls them.

Compression drivers receive uncompressed video data from a video source. Typically, the video source is a video application, which in turn receives the video from a video-capture driver or a disk file. The uncompressed video data is passed into the driver, and the compressed video data is returned to the application, which may then save it into a file. A decompression driver receives compressed video data, typically from a video application, and returns the uncompressed video data to the application, or writes it to the display device or to a display driver.

A video application uses function calls to interact with a compression driver. For compression, the application uses some or all of the following functions, among others.

ICCompress Compress data.
ICCompressBegin Prepare compressor driver for compressing data.
ICCompressEnd Tell the compressor driver to end compression.
ICCompressGetFormat Determine the output format of a compressor.
ICCompressGetSize Get the size of the compressed data.
ICCompressQuery Determine if a compressor can compress a specific format.

The ICCompress, ICCompressBegin, and ICCompressQuery functions use a BITMAPINFO structure and a BITMAPINFOHEADER structure to exchange information with the compression driver concerning the input and output formats for the video information. Calling ICCompress causes the compression driver to receive an ICCOMPRESS data structure. This structure has the following format:

```
typedef struct {
    DWORD dwFlags;
    LPBITMAPINFOHEADER IpbiOutput;
    LPVOID IpOutput;
    LPBITMAPINFOHEADER IpbiInput;
    LPVOID IpInput;
    LPDWORD Ipckid;
    LPDWORD IpdwFlags;
    LONG IFrameNum;
    DWORD dwFrameSize;
    DWORD dwQuality;
    LPBITMAPINFOHEADER IpbiPrev;
    LPVOID IpPrev;
}ICCOMPRESS;
``` dwFlags
Specifies flags used for compression. The ICCOMPRESS_KEYFRAME flag is defined and indicates that the input data should be treated as a key frame.
IpbiOutput
Specifies a pointer to a BITMAPINFOHEADER structure containing the output (compressed) format.
IpOutput
Specifies a pointer to the buffer where the driver should write the compressed data.
IpbiInput
Specifies a pointer to a BITMAPINFOHEADER structure containing the input format.
Ipinput
Specifies a pointer to the buffer containing input data.
Ipckid
Specifies a pointer to a buffer used to return the chunk ID for data in a tagged format video file.
IpdwFlags
Specifies a pointer to a buffer used to return flags for the video tag file index.
IFrameNum
Specifies the frame number of the frame to compress.
dwFrameSize
Specifies zero, or the desired maximum size (in bytes) for compressing this frame.
dwQuality
Specifies the compression quality.
IpbiPrev
Specifies a pointer to a BITMAPINFOHEADER structure containing the format of the previous frame. Normally, this is the same as the input format.
IpPrev
Specifies a pointer to the buffer containing the previous frame.

To set and retrieve configuration, state, and other information concerning the compression process, the application uses some or all of the following functions, among others:

ICConfigure—displays the configuration dialog box of a compressor
ICGetinfo—obtains information about a compressor
ICGetState—gets the state of a compressor
ICSetState—sets the state of a compressor The detailed syntax of particular functions is described in the Microsoft Video for Windows 1.1 Programmer's Guide.

Improvements Needed

Conventional Windows compression drivers have several limitations. First, because they are DLLs, conventional Windows compression drivers operate at the execution priority of the calling application in the computer system. If the application runs at a low priority, so will the compression driver. It is desireable for compression drivers to be guaranteed a high priority to help ensure real-time response. Second, as installable device drivers, Windows compression drivers have an interface which is highly specialized for the Windows family of computer operating systems, which makes them difficult to port to other computer platforms. The current compression driver interface is strictly synchronous; frames are submitted for compression and are returned compressed before the next frame is submitted. It is desireable that the interface to the compression driver is platform independent and self-contained, so that the driver may be used on a variety of hardware and software platforms. Futher, the driver interface should allow for dynamic installation and deinstallation of the driver, should be language-independent, and should allow a client application to query for the functionality supported by the interface. The driver should support the introduction of latency into the video stream, and should support both synchronous and asynchronous modes of operation.

SUMMARY OF THE INVENTION

A memory comprising a means for specifying synchronous or asynchronous compression of at least one uncompressed video frame, for specifying latency in the compression of the at least one uncompressed video frame, for initiating asynchronous compression of the at least one uncompressed video frame by a video compressor, for asynchronously retrieving from the video compressor at least one compressed video frame, for terminating asynchronous compression of the at least one uncompressed video frames by the video compressor, and for immediately retrieving from the video compressor the at least one compressed video frame when the at least one compressed video frame remains unretrieved after asynchronous compression is terminated.

DETAILED DESCRIPTION

Figure 1:
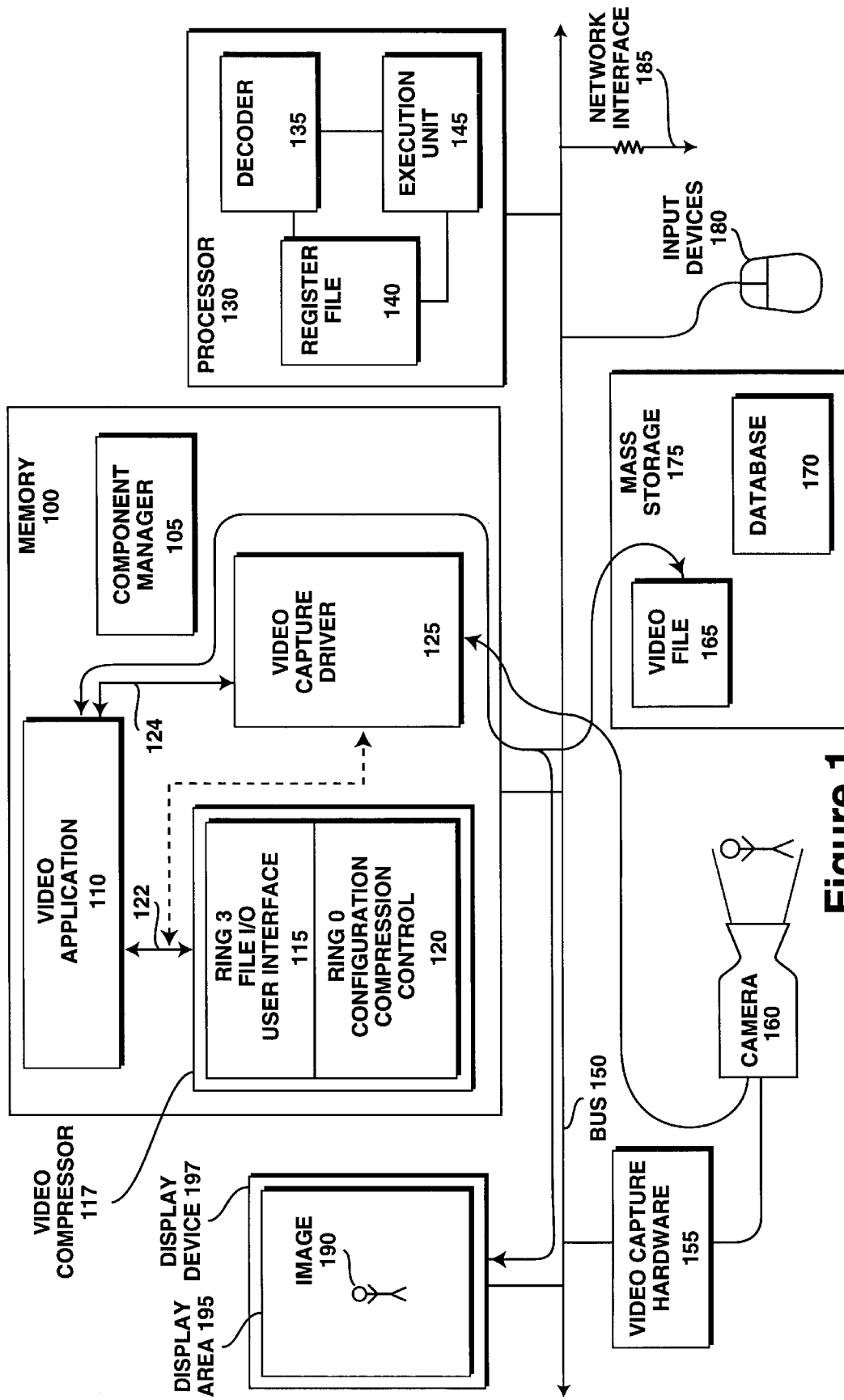
FIG. 1 illustrates a computer system utilizing a COM video interface supporting synchronous and asynchronous compression.

In the following description, numerous specific details are set forth such as circuits, flow diagrams, etc, in order to provide a thorough understanding of the present invention. In other instances, well-known structures and techniques have not been shown in detail because to do so would unnecessarily obscure the present invention. The specific arrangements and methods described herein are merely illustrative of the principles of the present invention. Numerous modifications in form and detail may be made by those of ordinary skill in the art without departing from the scope of the invention. For example, the names of functions and the programming languages used to implement them may be changed without departing from the scope of the invention.

The invention is an improved interface for video compression, implemented using the Component Object Model and supporting both synchronous and asynchronous compression of video frames. In synchronous mode, the client software calls the interface requesting that a single frame be compressed. The compressed frame is provided when the call to the interface returns. For multiple frames, the client calls the interface repeatedly, once for each frame. In asynchronous mode, the client provides one or more uncompressed frames to the interface, and then calls the interface to start the compression. Compressed frames are not normally returned immediately when compression is initiated asynchronously. Instead, the client polls the interface to determine when compression is completed on each frame, or else the client is called back by the interface when a compressed frame is available.

Using the Component Object Model (COM), a video compressor may be implemented with 1) a higher execution priority, 2) cross-platform support, 3) dynamic installation and deinstallation of the compressor, and 4) language-independent function calling.

The COM is a software architecture defined by Microsoft Corp. that allows software components (objects) to be combined in a standard way. COM is not dependent on any particular programming language, provides for dynamic loading of components, allows for the run-time determination of a component's interface, is available on multiple platforms (such as Microsoft® Windows®, Microsoft Windows NT®, Apple® Macintosh®, and UNIX®), and is extensible.

A COM object is a piece of program code that exports a set of functionality. Every COM object exports a base interface, called IUnknown, along with other interfaces specific to the object. An interface is a collection of functions which are logically related. Another way of saying this is that a COM interface is a small but useful set of semantically related operations (functions). Objects usually have some associated data, but this data is not directly exposed to other objects. Objects always access the data of another object through interfaces.

The following syntax is used to describe a COM interface:

```
DECLARE_INTERFACE_(Iderived, Ibase) {
    STDMETHOD (Function_One)(THIS_long) PURE;
    STDMETHOD_(long, Function_Two)(THIS) PURE;
}
```

The items in upper case are precompiler macros. When used with the C++ programming language and the standard Microsoft-provided header files, the COM interface described above expands to:

```
struct Iderived: public Ibase {
    HRESULT_stdcall Function_One(long)=0;
    long_stdcall Function_Two()=0;
}
```

DECLARE_INTERFACE_ expands to the definition of a structure named Iderived. The trailing "_" on DECLARE_INTERFACE_ allows for the specification of a base class from which Iderived is derived. In the example, the base class is called Ibase. The macro STDMETHOD expands to a definition of the member function Function_One with a return type of HRESULT, a calling convention of _stdcall, and a single argument of type long. In C++, every member function of a class also includes a hidden argument called "this", which references the memory of an object declared with the class. When expanded in C++ the THIS_macro expands to null (nothing), however, in other languages the THIS_macro might expand to an explicit reference to the object memory. It also indicates that additional arguments follow in the definition. The THIS macro (as distinguished from THIS_) is used to specify that no further arguments are to be defined for the function. The PURE macro expands to "=0" which is used to indicate that the function declaration is a pure definition. Finally, the STDMETHOD_macro (as distinguished from the STDMETHOD macro) is used in situations where the function returns a result other than HRESULT. In the example, the result is of type long.

To enable cross-platform, language-independent function calling, COM defines a standard way to lay out virtual function tables in memory. Virtual function tables are lists of pointers to the functions provided by a COM interface. COM also defines a standard way to call the functions listed in the virtual function table. Applications or other components that use functions in the table receive a pointer to the table of function pointers. The indirection allows for table sharing with lower memory overhead.

A unique identifier is assigned to each object and to each interface of each object, preventing naming conflicts and allowing an operating system component called the Component Object Library to find objects with particular capabilities. All objects are required to implement an interface called IUnknown, and all other COM interfaces derive from Iunknown. Clients of the object use IUnknown to obtain or release access to the other interfaces for the object. IUnknown has three functions: QueryInterface, AddRef, and Release.

AddRef and Release are counting functions. AddRef is called when a client is using the interface; it increases the reference count of the interface. Release is called when a client is done using that interface; it decreases the reference count. While the object's interface reference counts are nonzero, it must remain in memory; when the reference counts becomes zero, the object can safely remove itself from memory. Queryinterface is the function by which an interface pointer is retrieved from the object. A client calls QueryInterface requesting a pointer to the interface that implements a particular function. If the object supports the interface, it returns an interface pointer. Otherwise, an error value is returned.

In summary, the Component Object Model enables the implementation of an installable video compressor with a high execution priority, cross-platform support, run-time determination of interface capabilities, and language-independent function calling.

FIG. 1 illustrates a computer system utilizing a COM video interface supporting synchronous and asynchronous compression. In FIG. 1, a memory 100 stores a video application 110, a video compressor 117, a video capture driver 125, and a component manager 105. The memory 100 represents one or more mechanisms for storing data. For example, the memory 100 may include machine-readable mediums such as read only memory (ROM), random access memory (RAM), magnetic disk storage mediums, optical storage mediums, flash memory devices, and/or other machine-readable mediums. The memory 100 is coupled to a processor 130 by way of a bus 150 The bus 150 represents one or more busses (e.g., PCI, ISA, X-Bus, EISA, VESA, optical coupling, etc.) and bridges (also termed as bus controllers). The processor 130 represents a central processing unit of any type of architecture, such as CISC, RISC, VLIW, or a hybrid architecture. In addition, the processor 130 could be implemented on one or more chips. Using the bus 150, the processor 130 accesses the various elements stored in the memory 100. The processor 130 contains a decoder 135 for decoding instructions, a register file 140 for storing the operands and results of executing instructions, and an execution unit 145 for executing instructions. Of course, the processor 130 contains additional circuitry which is not necessary to understanding the invention. The register file 140 is coupled to the decoder 135, and the execution unit 145 is coupled to the decoder 135 and the register file 140. The operands of instructions decoded by the decoder 135 are made available to the execution unit 145 by placing them in the register file 140. The register file 140 contains data registers to store arguments for the received instructions. The register file 140 may contain status registers, control registers, and address registers for controlling the execution of the recieved instructions. The decoder may be implemented using hard-wired circuitry, a Programmable-Gate-Array, a microcoded ROM, or by any other function known in the art.

A number of user input devices 180 such as a keyboard or a mouse, are also coupled to the bus 150. In addition, a display device 197 is coupled to the bus 150. A network 185 may also be coupled to the bus 150. While this embodiment is described in relation to a single processor computer system, the invention could be implemented in a multi-processor computer system.

Furthermore, although one embodiment of the invention uses a RAM for memory, other types of memory could be used without departing from the scope of the invention. For example, a ROM, a flash memory, a cache memory, a hard disk, or any other volatile or non-volatile computer memory could be used.

A mass-storage device 175 coupled to the bus 150 can comprise a magnetic disk, optical disk, or streaming tape, among other devices. The mass-storage device 175 provides permanent storage in the computer system for large amounts of information. In one embodiment, the mass-storage device 175 stores a video file 165 and a database 170 of COM objects in the system. Of course, the mass-storage device 175 could store other types of software and information not required for understanding the invention. Other embodiments are possible, for example, the video file 165 and the database 170 could be stored in memory 100 instead of in mass-storage 175. Such an embodiment corresponds to a "diskless" workstation.

A display device 197 coupled to the bus 150 displays information to a user of the computer system. The display device can include a display memory, a cathode ray tube (CRT), or a flat panel display, among other technologies. The display device 197 includes a display area 195 for displaying a computer-generated image 190. Video capture hardware 155 receives video information from camera 160 and transfers this video information to the bus 150, from which point it is available to the processor 130, the display device 197, the memory 100, and the mass storage 175.

The video compressor 117 is implemented using a Ring 3 (low-priority) component 115 and a Ring 0 (high-priority) component 120. The Ring 0 component 120 is implemented as a COM object, while the Ring 3 component 115 is typically a DLL. The Ring 3 component 115 implements file I/O and user interface functions which cannot be easily implemented in the Ring 0 component 120 due to operating system limitations in some Windows environments. The Ring 0 component 120 implements configuration, compression, and control functionality. The video application 110 communicates with the video compressor 117 by way of the compression interfaces 122. The video application 110 also communicates with the video capture driver 125 by way of the video capture interface 124. In alternate embodiments, the video application 110 may be replaced by a DLL or another COM object. The video capture driver 125 may optionally communicate directly with the video compressor 117 by way of compression interfaces 122.

Video information is captured using the camera 160 and video capture hardware 155. The captured video information is passed by the video capture hardware 155 over the bus 150 to memory 100. The video information may be passed to memory 100 under the control of the processor 130, using direct memory access (DMA), or by other techniques. Using the processor 130, the video capture driver 125 aquires the video information and passes it along to the video application 110. The video application 110 requests the services of the video compressor 117. The video application 110 can determine which video compressor 117 to use for the particular video format by using the component manager 105 to reference the database 170 of available COM objects. A compatible video compressor 117 is then loaded into memory 100 and accessed by the video application 110 using compressor interfaces 122. The video application then saves the compressed video to the file 165. If the video is not compressed, it may be displayed on the display area 195 of the display device 197.

In one embodiment, the sequence of events surrounding video capture is as follows:

1) The video application 110 is loaded into memory 100. This causes the video capture driver 125 to be loaded into memory 100.

2) The video application 110 specifies a compression format for the aquired video, which causes the video compressor 117 to be loaded into memory.

3) The video application 110 initiates the capture of video information. This causes captured video information to be passed by the video capture hardware 155 over the bus 150 to memory 100, under direction of the video capture driver 125.

4) The captured video information is provided to the video application 110 by the video capture driver 125, from which point it may be saved to the file 165, displayed on the display area 195, etc.

Among the compression interfaces 122 are interfaces for compression and configuration. The compression interfaces are called IVidCompress and IVidCompressEx, while the configuration interface is called IVidConfigure. IVidCompress implements the compression functionality of conventional Windows compression drivers. In particular, IVidCompress implements the functionality of ICCompress, ICCompressBegin, ICCompressEnd, ICCompressGetFormat, ICCompressGetSize, and ICCompressQuery. In addition, IVidCompress may implement other conventional compression-related functions which are not necessary to understanding the invention. The interface declaration of IVidCompress is as follows.

DECLARE_INTERFACE_(IVidCompress, IUnknown){
STDMETHOD_(LRESULT, Compress)(THIS_DWORD, DWORD) PURE;
STDMETHOD_(LRESULT, CompressBegin)(THIS_DWORD, DWORD, DWORD) PURE;
STDMETHOD_(LRESULT, CompressEnd)(THIS_DWORD, DWORD) PURE;
STDMETHOD_(LRESULT, CompressGetFormat)(THIS_DWORD, DWORD) PURE;
STDMETHOD_(LRESULT, CompressGetSize)(THIS_DWORD, DWORD) PURE;
STDMETHOD_(LRESULT, CompressQuery)(THIS_DWORD, DWORD) PURE; STDMETHOD_(LRESULT, CompressNotify)(THIS_DWORD, DWORD) PURE;
};

The CompressNotify function implements functionality not found in conventional compression drivers. This function is called to notify the video compressor 117 that asynchronous compression will be used and to provide the compressor 117 with information related to the compression asynchronous compression session. In response, the compressor 117 may perform static optimizations for asynchronous compression. The syntax of CompressNotify is STDMETHODIMP_(LRESULT) CompressNotify(THIS_DWORD dwParam1, DWORD dwParam2)

dwParam1 points to an ICCOMPRESSINFO structure, described below.
dwParam2 specifies the size of the ICCOMPRESSINFO structure.
The function returns ICERR_OK if successful, or an error code otherwise.
Compression interfaces 122 may also include the IVidCompressEx interface. The IVidCompressEx interface contains functions for including latency during compression. The syntax is:

DECLARE_INTERFACE_(IVidCompressEx, IUnknown){
STDMETHOD_(LRESULT, CompressEx)(THIS_DWORD, DWORD) PURE;
STDMETHOD_(LRESULT, CompressExBegin)(THIS_DWORD, DWORD) PURE;
STDMETHOD_(LRESULT, CompressExQuery)(THIS_DWORD, DWORD) PURE;
};

The CompressEx function compresses a frame from the specified input format to the specified output format. This function is an extended version of the IVidCompress interface's Compress function to allow for introducing latency into asynchronous compression. The syntax is:

STDMETHODIMP_(LRESULT) CompressEx(THIS_DWORD dwParam1, DWORD dwParam2)

dwParam1 points to an ICCOMPRESSEX structure. Some fields are changed or have different interpretations from those in ICCOMPRESS (see below). The changes reflect the fact that since latency may be introduced into the video stream, it is legal to not immediately return a compressed frame on return from CompressEx. Also, it is legal to call the function with no input frame, in which case pending asynchronous frames should be returned to the caller. Furthermore, in asynchronous mode the input and output frame numbers may be different.

dwParam2 specifies the size of the ICCOMPRESSEX structure.
The function returns ICERR_OK if successful, or an error code otherwise.
The CompressExBegin function prepares the compressor 117 for compression. This function is an extended version of the IVidCompress interface's CompressBegin function to allow for introducing latency into into asynchronous compression. The syntax is:

STDMETHODIMP_(LRESULT) CompressExBegin (THIS_DWORD dwParam1, DWORD dwParam2)

dwParam1 specifies a pointer to a BITMAPINFOEX structure (described below) that describes the input format. BITMAPINFOEX is an extension of the BITMAPINFO structure containing a modified version of BITMAPINFOHEADER called BITMAPINFOHEADEREX). A member called IpdwMaxFrameLag is added to specify latency in the video stream and a member dwFlags is added to specify latency related flags.
dwParam2 specifies a pointer to a BITMAPINFO structure that describes the output format.
If the compressor 117 supports the compression according to the formats specified in dwParam1 and dwParam2, it returns ICERR_OK, otherwise it returns ICERR_BADFORMAT. If the location pointed to by the IpdwMaxFrameLag in BITMAPINFOHEADEREX is non-zero on entry, the compressor 117 fills the location pointed to by this field with the actual number of frames of latency it will introduce. The compressor 117 may not return a value for maximum frame latency greater than that specified on input.
The CompressExQuery function is called to determine if the compressor 117 can compress a specific input format or if it can compress the input format to a specific output format. This function is an extension of the IVidCompress interface's CompressQuery function to allow for introducing latency during asynchronous compression. The syntax is:

STDMETHODIMP_(LRESULT) CompressExQuery (THIS_DWORD dwParam1, DWORD dwParam2)

dwParam1 specifies a pointer to a BITMAPINFOEX structure that describes the input format.
dwParam2 is the address of a BITMAPINFO structure containing the output format. A value of zero for this parameter indicates that any output format is acceptable.
If the compressor 117 supports the compression according to the formats specified in dwParam1 and dwParam2, it returns ICERR_OK, otherwise it returns ICERR_BADFORMAT.
IVidConfigure implements the configuration functionality of conventional Windows compression drivers. In particular, IVidConfigure implements the functionality of ICConfigure, ICGetinfo, ICGetState, and ICSetState. In addition, IVidCompress may implement other conventional compression-related functions which are not necessary to understanding the invention. The interface declaration of IVidConfigure is as follows:

DECLARE_INTERFACE_(IVidConfigure, IUnknown){
STDMETHOD_(LRESULT, Configure)(THIS_DWORD, DWORD) PURE;

```
STDMETHOD_(LRESULT, Getinfo)(THIS_DWORD,
    DWORD) PURE;
STDMETHOD_(LRESULT, GetState)(THIS_DWORD,
    DWORD) PURE;
STDMETHOD_(LRESULT, SetControl)(THIS_DWORD,
    DWORD) PURE;
STDMETHOD_(LRESULT, SetState)(THIS_DWORD,
    DWORD) PURE;
};
```

The SetControl function implements functionality not found in conventional compression drivers. This function is called to specific control information to the compressor 117 not supported elsewhere in IVidConfigure functions. The syntax of SetControl is:

```
STDMETHODIMP_(LRESULT) SetControl(THIS_
DWORD dwParam1, DWORD dwParam2)
``` dwParam1 specifies the type of control information being sent. Control information is specific to the compression algorithm. Some examples include information related to motion estimation, spacial filtering, and resiliency level.

dwParam2 varies based on the compression algorithm and the type of control specified by dwParam1.

The compressor 117 returns ICERR_OK if it supports the control type and ICERR_UNSUPPORTED otherwise.

A pointer to a memory allocation interface is passed in to the compressor using the Create function. The compressor 117 uses this interface pointer to allocate and free memory. The compressor 117 may use the memory services of other software components such as the Windows Virtual Machine Manager (VMM), for example to allocate page aligned memory. However, doing so reduces the portability of the compressor.

In addition to defining new functions, the compression interfaces 122 define new data structures for use with the new functions. These new data structures are CAPTUREPARAMS, BITMAPINFOEX, BITMAPINFOHEADEREX, and ICCOMPRESSEX. The CAPTUREPARAMS, BITMAPINFOEX, BITMAPINFOHEADEREX, and ICCOMPRESSEX data structures are used by the functions CompressExBegin, CompressEx, and CompressExQuery.

The BITMAPINFOEX structure has the following format:

```
typedef struct {
BITMAPINFOHEADEREX bmiHeader;
RGBQUAD bmiColors[1];
}BITMAPINFOEX;
```

The BITMAPINFOHEADEREX structure has all of the members defined in the BITMAPINFOHEADER structure, plus the following additional or redefined members:

```
DWORD dwFlags;
LPDWORD lpdwMaxFrameLag;
LPCAPTUREPARAMS lpCaptParams;
``` dwFlags specifies flags for asynchronous mode. They can be one of the following:

```
ICCOMPRESSEX_FRAMEREORDER
ICCOMPRESSEX_SUPPORT_ASYNCHRONOUS_
    DECODE
```

The ICCOMPRESSEX_FRAMEREORDER flag is used to indicate that the compressor 117 reorders frames. The ICCOMPRESSEX_SUPPORT_ASYNCHRONOUS_DECODE flag can only be specified if ICCOMPRESSEX_FRAMEREORDER is set and indicates that asynchronous compression is supported.

The lpdwMaxFrameLag member allows the client to specify latency during asynchronous compression. On input, this member points to a location containing the maximum latency the compressor 117 may introduce, in number of frames. It this value is zero, no latency is introduced. If the value is non-zero, the compressor should return in this location the actual amount of latency it will introduce, which must not be greater than the value on input. For example, if the compressor returns a non-zero value, say n, then the compressor may return it's first actual compressed frame on the (n+1)st call to CompressEx. In this case, the first n calls to CompressEx return zero in the biSizeImage field of the BITMAPINFOHEADER for the output format in the CompressEx function's ICCOMPRESSEX structure (described below). By returning zero this way, CompressEx indicates that no compressed frame is returned.

lpCaptParams is a pointer to a CAPTUREPARAMS data structure (not to be confused with the Microsoft-defined CAPTUREPARMS structure). This structure adds parameters the compressor 117 may require but which are not included in the BITMAPINFO structure. It also allows the compressor 117 to specify a particular memory layout for the video information provided by the capture driver 125. The compressor may specify a particular memory layout to optimize the compression of the video information. The format of this structure is:

```
typedef struct {
DWORD dwSize;// Structure size
DWORD dwYPitch;// Y plane pitch
DWORD dwVPitch;// V plane pitch
DWORD dwUPitch;// U plane pitch
DWORD dwYAlign;// Y plane alignment
DWORD dwVAlign;// V plane alignment
DWORD dwUAlign;// U plane alignment
DWORD dwFlags;// Flags
}CAPTUREPARAMS;
```
dwYPitch is a requested pitch for the Y plane.
dwVPitch is a requested pitch for the V plane.
dwUPitch is a requested pitch for the U plane.
dwYAlign is a requested alignment for the Y plane.
dwVAlign is a requested alignment for the V plane.
dwUAlign is a requested alignment for the U plane.
dwFlags contains other requests as flag values. Currently defined are:
CPFLAG_USE7BITS// Generate 7-bit pels
CPFLAG_YUV12// Generate YUV12 format If the compressor does not care about a particular parameter defined in this structure, it sets that field to −1.

To support asynchronous mode and latency in compression, the ICCOMPRESS structure is modified. This structure is used by the CompressEx function, and has the same members as ICCOMPRESS, with some new or modified members as follows:

```
LPBITMAPINFOHEADER lpbiOutput;
LPBITMAPINFOHEADEREX lpbiInput;
```

LPVOID IpInput;
LPLONG IpIFrameNum;

The new structure is called ICCOMPRESSEX. The differences from ICCOMPRESS are the change of the IFrameNum field to IpIFrameNum and the interpretation of the IpbiOutput, IpbiInput, and Ipinput. IpIFrameNum points to a location that contains the input frame number on entry and receives the output frame number on return. Since latency may be introduced into the video stream, the input and output frame numbers may be different. IpbiOutput points to a BITMAPINFOHEADER structure that describes the output frame format. If latency is introduced, it is valid to return a frame of zero size (i.e. the compressor 117 is storing up frames). In this case, the compressor 117 sets the biSizeImage field of BITMAPINFOHEADER pointed to by IpbiOutput to zero. IpbiInput points to a BITMAPINFOHEADEREX structure that describes the input frame format. If latency has been introduced, it is valid for the client to set this pointer and the IpInput pointer to null to signify the end of the input video stream. The client will continue to call the compressor 117 in this way to get the compressed frames stored up.

The ICCOMPRESSINFO structure is passed to the compressor 117 as a parameter to the CompressNotify function. The format is:

typedef struct {
DWORD dwSize;// Structure size
DWORD dwFrameRate;// Frame rate in microseconds/ frame
}ICCOMPRESSINFO;

dwSize is the size of the structure.
dwFrameRate is the frame rate in microseconds/frame.

For asynchronous compression, the video application typically specifies a latency comprising N video frames. The application starts submits video information to the compressor, which buffers the first N output frames internally. Beginning with frame N+1, the compressor returns output frames to the application. The returned frames may not be in order. From this point on the compressor returns a single output frame per input frame. Before the application terminates compression, it retrieves any output frames which remain buffered by the compressor. It does this by calling CompressEx with NULL input frames specified. For each call, the compressor returns a remaining stored frame.

Figure 2:
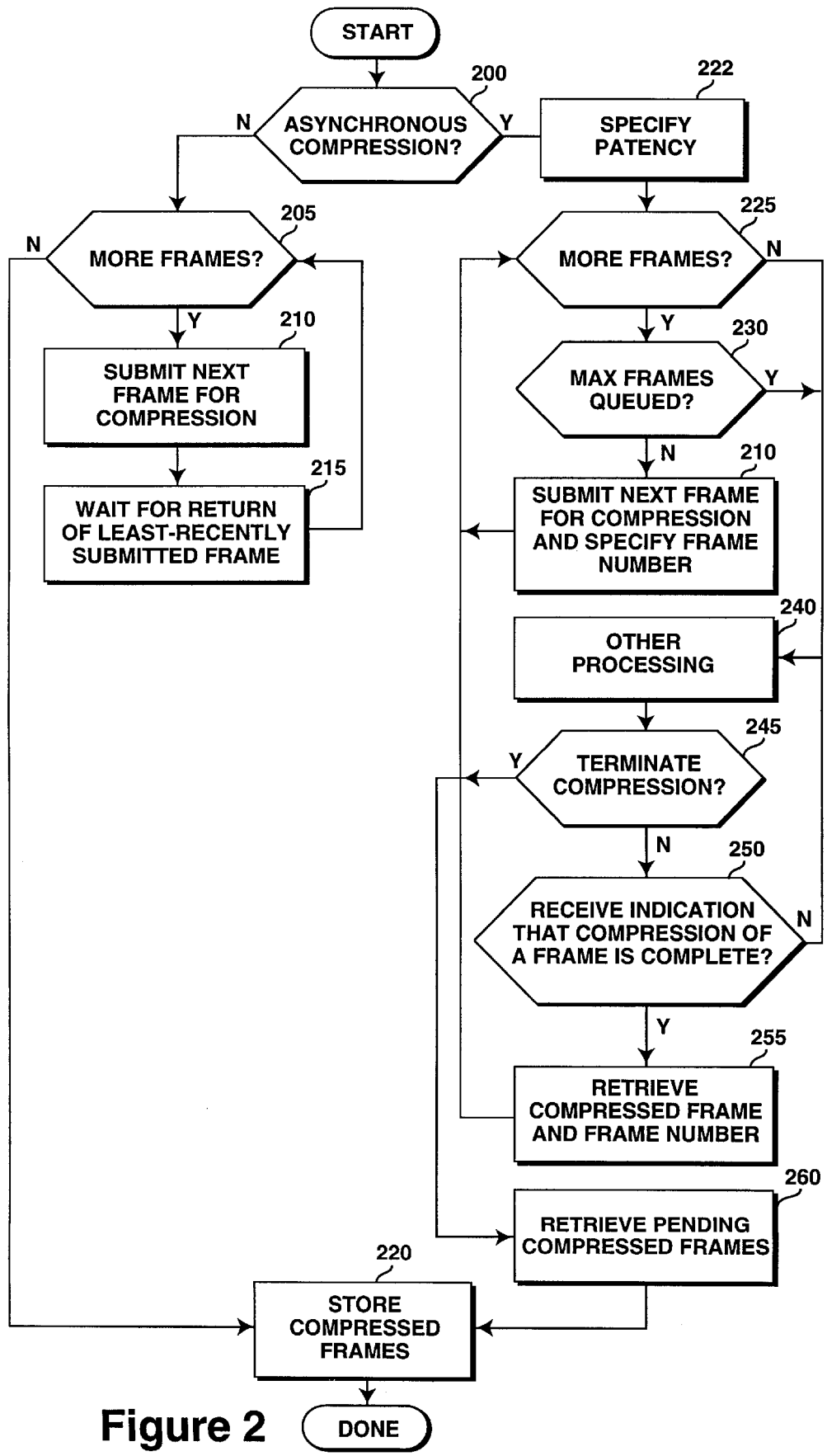
FIG. 2 illustrates the steps of a method for asynchronous video compression.

FIG. 2 shows one method for performing asynchronous compression of video frames using the structures and methods described herein. At step 200, a determination is made to use synchronous or asynchronous compression. If synchronous compression is chosen, then a determination is made whether there are frames available for compression at step 205. If frames are available, then at step 210 a frame is submitted for compression. The method then waits for the compressed frame corresponding to the least-recently submitted frame to be returned at step 215. In other words, for synchronous processing frames are compressed and returned in the order submitted. Control then passes back to step 205 where the determination is then made whether there are more frames for compression. When there are no more frames available for compression, the compressed frames are stored at step 220 and the method concludes.

If asynchronous compression is chosen, then the latency to use is speficified at step 222. Next, a determination is made at step 225 as to whether frames are available for compression. If frames are available, then a determination is made at step 230 whether the maximum number of frames which may be queued (pending) asynchronously has been reached. If this limit has not been reached, then the next frame is submitted for compression at step 235. The frame number is also specified at this step, since the processing is asynchronous and may proceed in any frame order. Control then returns to step 225 to determine if more frames are available for queuing. If no more frames are available at step 225, or if the maximum queue size has been reached at step 230, then control transfers to step 240, where other processing is performed. Other processing 240 may be any type of processing available in a computer system, for example the management of files, user interfaces, mathematical computations, and so on. Compression of the frames queued in steps 225–235 proceeds in the background while other processing 240 is performed. A determination is then made at step 245 as to whether compression has been terminated. Compression may be terminated in any number of ways, including as a consequence of user input or as a consequence of queing the last frame for compression. If compression has not been terminated, then a check is made at step 250 to determine if an indication has been received that a compression on one of the queued frames in complete and the compressed frame is available. If no such indication was recieved, then other processing 240 is again performed. If such an indication was recieved, then the compressed frame and the frame number of the compressed frame are retrieved at step 255. Control then returns to step 225 to determine if there are more frames available for queuing.

If at step 245 it is determined that compression has been terminated, then control passes to step 260 where pending compressed frames are retrieved immediately. After immediately retrieving the compressed frames remaining in the queue, the compressed frames are stored 220 and the method concludes.

In summary, by way of a combination of new functions and data structures, the improved video compression interface enables both synchronous and asynchronous compression of video frames, as well as the introduction of latency into the video stream. High priority, dynamic installation and removal, cross-platform support and language-independence are achieved by implementing the improved interface as a COM object.

Although this invention has been shown in relation to a particular embodiment, it should not be considered so limited. Rather, the invention is limited only by the scope of the appended claims.

What is claimed is:

1. A memory comprising:
A) means for specifying synchronous or asynchronous compression of at least one uncompressed video frame;
B) means for specifying latency in the compression of the at least one uncompressed video frame;
C) means for initiating asynchronous compression of the at least one uncompressed video frame by a video compressor means;
C) means for asynchronously retrieving from the video compressor means at least one compressed video frame;
D) means for terminating asynchronous compression of the at least one uncompressed video frames by the video compressor means; and
E) means for immediately retrieving from the video compressor means the at least one compressed video frame when the at least one compressed video frame remains unretrieved after asynchronous compression is terminated.

2. The memory of claim 1 in which the means for specifying latency in the compression of the at least one uncompressed video frame further comprises:

i) means for setting frame reordering, asynchronous frame decoding, and the maximum tolerable frame lag for the at least one uncompressed video frame;

ii) means for indicating that an input frame to the video compressor means will become a stored frame and will not be returned immediately as the at least one compressed video frame.

3. The memory of claim 1 further comprising means for determining the current settings for frame reordering, asynchronous frame decoding, and the maximum tolerable frame lag for the at least one uncompressed video frame.

4. The memory of claim 1 further comprising means for specifying the U,V, and Y plane pitch and plane alignment for the at least one uncompressed video frame.

5. The memory of claim 1 further comprising a means for displaying a user interface, said means for displaying a user interface executing at a lower priority than the video compressor means.

6. A memory comprising:

A) a first data structure having fields of a BITMAPINFO structure and additional fields comprising:
i) a frame latency for asynchronous compression;
ii) an indication of frame reordering and an indication of support for asynchronous compression;
iii) a pointer to a second data structure for specifying additional compression parameters;

B) a third data structure comprising the first data structure and at least one additional field for specifying the colors of a video frame;

C) a fourth data structure comprising the fields of an ICCOMPRESS structure and additional fields comprising
i) a pointer to the third data structure for specifying the input format of the video frame;
ii) the input and output frame numbers of the video frame;

D) a fifth data structure comprising a field for specifying a compression frame rate;

E) a first function to notify a video compressor that asynchronous compression will be used and to specify asynchronous compression parameters to the video compressor, the first function comprising a pointer to the fifth data structure;

F) a second function to prepare the video compressor to compress the video frame, the second function comprising a pointer to the first data structure;

G) a third function to cause the video compressor to compress the video frame, the third function comprising a pointer to the fourth data structure; and H) a fourth function to query the video compressor for supported compression formats, the fourth function comprising a pointer to the first data structure.

7. A method to compress at least one video frame asynchronously, the method comprising the steps of:

A) specifying a frame latency for the at least one video frame;

B) submitting the at least one video frame for asynchronous compression and specifying an input frame number;

C) receiving an indication that compression has completed asynchronously;

D) retrieving a compressed frame and an output frame number;

E) terminating asynchronous compression of the at least one video frame; and

F) retrieving any compressed frames which remain pending after asynchronous compression is terminated.

8. The method of claim 7 in which the step of retrieving any compressed frames which remain pending after asynchronous compression is terminated is accomplished by submitting a NULL input frame.

* * * * *